(12) United States Patent
Park et al.

(10) Patent No.: US 9,165,415 B2
(45) Date of Patent: Oct. 20, 2015

(54) METHOD AND APPARATUS FOR ACCESS AUTHENTICATION USING MOBILE TERMINAL

(75) Inventors: Jae-Min Park, Seoul (KR); Dong-Hoon Kye, Seoul (KR); Yong-Ki Min, Seoul (KR)

(73) Assignee: KT Corporation, Seongnam-Si (KR)

( * ) Notice: Subject to any disclaimer, the term of this patent is extended or adjusted under 35 U.S.C. 154(b) by 560 days.

(21) Appl. No.: 13/336,867

(22) Filed: Dec. 23, 2011

(65) Prior Publication Data

US 2012/0169462 A1 Jul. 5, 2012

(30) Foreign Application Priority Data

Dec. 31, 2010 (KR) .................. 10-2010-0140578

(51) Int. Cl.
*G05B 19/00* (2006.01)
*G07C 9/00* (2006.01)
*H04L 29/06* (2006.01)
*H04W 4/00* (2009.01)
*H04W 4/02* (2009.01)

(52) U.S. Cl.
CPC ........ *G07C 9/00007* (2013.01); *G07C 9/00174* (2013.01); *G07C 9/00309* (2013.01); *G07C 9/00857* (2013.01); *H04L 63/0492* (2013.01); *H04W 4/008* (2013.01); *H04W 4/02* (2013.01)

(58) Field of Classification Search
USPC .......... 340/5.1, 5.2, 5.6, 5.61, 5.65, 5.8, 5.81, 340/572.1–572.9, 10.1–10.6; 455/456.1–456, 556.1, 556.2, 41.1, 455/41.2, 410–411; 235/375–386; 705/39
See application file for complete search history.

(56) References Cited

U.S. PATENT DOCUMENTS

| | | | | |
|---|---|---|---|---|
| 6,832,721 | B2 * | 12/2004 | Fujii | 235/382 |
| 7,012,503 | B2 * | 3/2006 | Nielsen | 340/5.6 |
| 7,185,808 | B2 * | 3/2007 | Mitsumoto | 235/382.5 |
| 7,205,882 | B2 * | 4/2007 | Libin | 340/5.28 |
| 7,967,215 | B2 * | 6/2011 | Kumar et al. | 235/492 |
| 8,313,026 | B2 * | 11/2012 | Chang et al. | 235/385 |
| 8,508,332 | B2 * | 8/2013 | Jones et al. | 340/5.2 |
| 2003/0228873 | A1 * | 12/2003 | Manzen | 455/456.3 |
| 2004/0066273 | A1 * | 4/2004 | Cortina et al. | 340/5.1 |
| 2009/0027159 | A1 * | 1/2009 | Bozionek et al. | 340/5.61 |

FOREIGN PATENT DOCUMENTS

| | | | |
|---|---|---|---|
| KR | 1020060088613 A | | 8/2006 |
| KR | 20100114005 A | | 10/2010 |
| WO | 2010027331 A1 | | 3/2010 |

OTHER PUBLICATIONS

Office Action dated Sep. 25, 2014 from the Korean Intellectual Property Office, in related Korean Patent Application No. 10-2010-0140578.

* cited by examiner

*Primary Examiner* — Steven Lim
*Assistant Examiner* — Ryan Sherwin
(74) *Attorney, Agent, or Firm* — Sughrue Mion, PLLC

(57) ABSTRACT

An access authentication method and apparatus in which access authentication is performed using positional data associated with access information data.

10 Claims, 4 Drawing Sheets

METHOD AND APPARATUS FOR ACCESS AUTHENTICATION USING MOBILE TERMINAL

CROSS-REFERENCE TO RELATED APPLICATIONS

This application claims priority from Korean Patent Application No. 10-2010-0140578, filed with the Korean Intellectual Property Office on Dec. 31, 2010, the disclosure of which is incorporated herein by reference in its entirety.

BACKGROUND

1. Technical Field

Exemplary embodiments relate to NFC (Near Field Communication) based technology, and more particularly, to methods and apparatuses for performing access authentication by duplicating data of an access authentication card to a user terminal.

2. Description of Related Art

A conventional access authentication system utilizes an identification (ID) card having information of user who is entering or exiting. It is an inconvenience that the person should always carry the ID card. Further, it is inconvenient for the user to carry a plurality of ID cards, such as an ID card for company and an ID card for home, all the time. In addition, it is inconvenient for the user to select a proper card among the plurality of cards and to contact the card to a reader for the access authentication.

Therefore, in accordance with the development of information telecommunication technologies, there is a need for method of performing access authentication by means of mobile terminals that are carried by people.

SUMMARY

According to an aspect of an exemplary embodiment, there is provided an apparatus of performing an access authentication, which is communicatively connected to an access authentication system.

According to an aspect of an exemplary embodiment, there is provided a user terminal that performs an access authentication through communication with an access authentication system connected to an access reader, the user terminal including: a smart card access authentication data and positional data associated with the access authentication data, a positional data obtaining device configured to obtain current positional data of the user terminal, and a controller configured to activate the access authentication data associated with the positional data that corresponds to the current positional data, wherein the smart card provides the activated access authentication data to the access reader in response to a radio frequency (RF) signal from the access reader to request the access authentication.

According to an aspect of an exemplary embodiment, there is provided a method of performing an access authentication in a user terminal that is communicatively coupled to an access authentication system.

According to an aspect of an exemplary embodiment, there is provided a method of performing an access authentication in a user terminal through communication with an access authentication system connected to an access reader, the method including: obtaining current positional data of the user terminal in response to receiving a radio frequency (RF) signal from the access reader, activating the access authentication data associated with positional data that corresponds to the current positional data among a plurality of access authentication data, and requesting the access authentication by providing the activated access authentication data to the access reader.

DETAILED DESCRIPTION OF EXEMPLARY EMBODIMENTS

Exemplary embodiments will be illustrated and described with reference to the accompanying drawings. The exemplary embodiments shall be construed as including all permutations, equivalents, and substitutes covered by the ideas and scope of the present disclosure. Throughout the description, when certain descriptions of well-known technologies readily understood by the skilled artisan will be omitted so as to not obscure the various technical aspects of the disclosure.

Terms such as "first" and "second" may be used in describing various elements, but the above elements shall not be restricted to the above terms. The above terms are used only to identify and distinguish one element from the other.

The terms used in the description are intended to describe certain exemplary embodiments only, and shall by no means restrict the exemplary embodiments. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, certain exemplary embodiments will be described with reference to the accompanying drawings.

Figure 1:
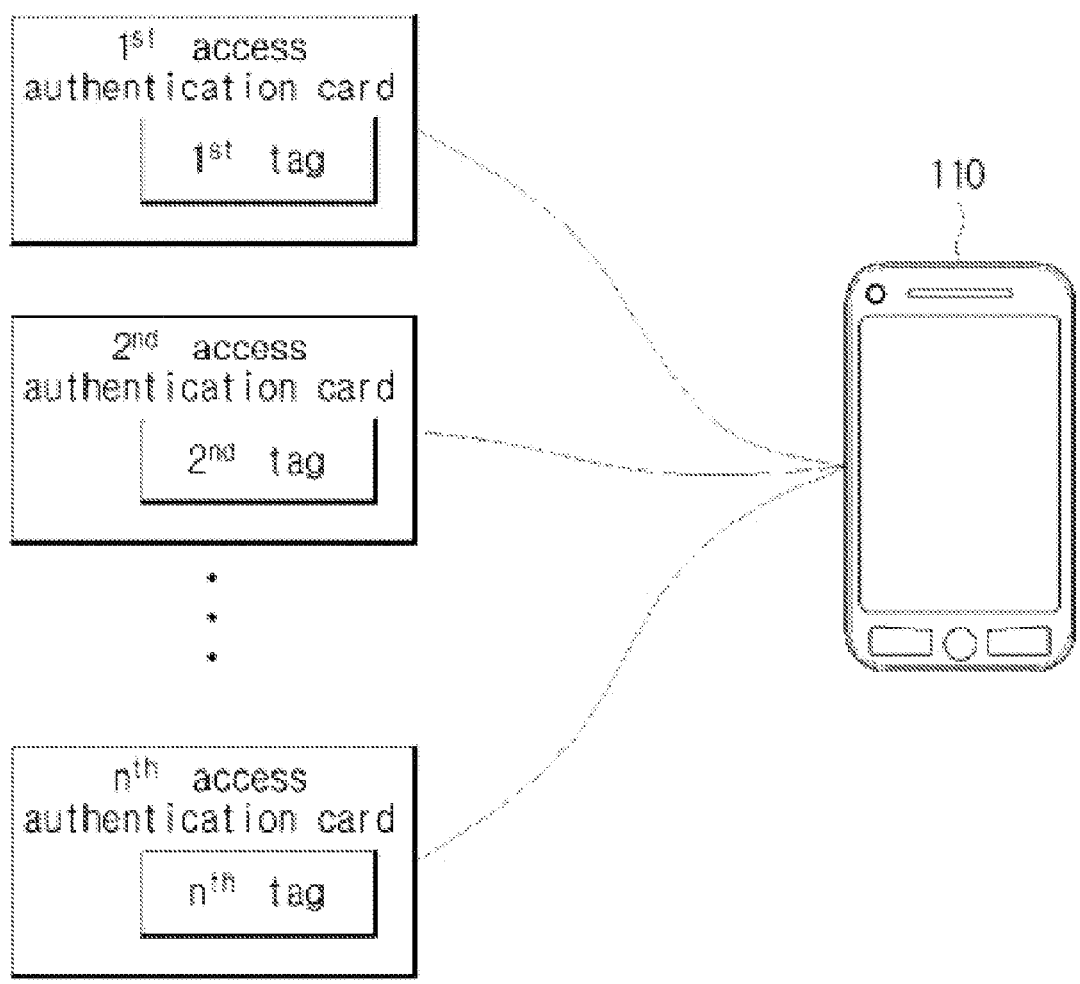
FIG. 1 illustrates a method of duplicating data of an access authentication card to a user terminal, according to an exemplary embodiment.

FIG. 1 illustrates a method of duplicating data of an access authentication card to a user terminal, according to an exemplary embodiment.

Referring to FIG. 1, the access authentication card has a tag, such as an radio frequency identification (RFID) tag, attached thereon or installed therein. The tag stores access authentication data corresponding to the access authentication card. The access authentication data comprises at least one of access identification data and password. The access identification data is identification data configured for access, for example, social security number, employee number, or access key data that is provided by an access authentication system.

The user terminal 110 is equipped with a tag reader, and the tag reader reads the access authentication data from a tag of the access authentication card to store the access authentication data in the user terminal. For example, the user terminal 110 may read each tag attached to one or more access authentication cards, respectively, to obtain a plurality of access authentication data and store the access authentication data of the one or more access authentication cards in the user terminal 110. The user terminal 110 then may perform the access authentication by using the stored access authentication data through the access authentication system. This will be described in detail below in reference to the accompanying drawings.

Figure 2:
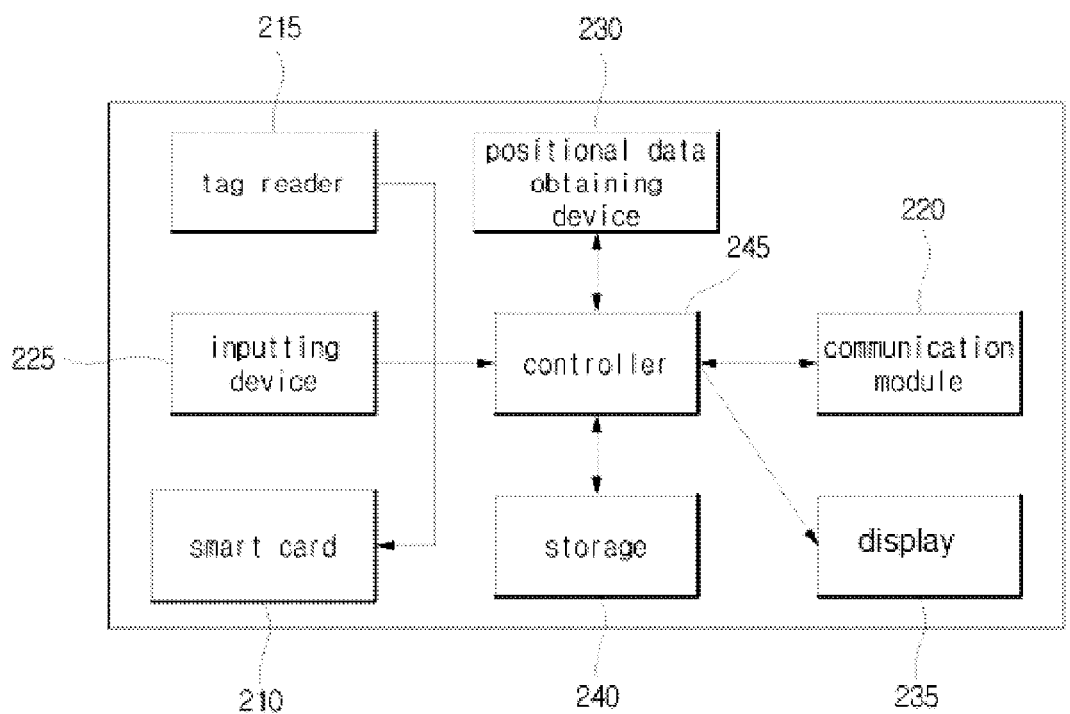
FIG. 2 is a block diagram of a user terminal, according to an exemplary embodiment.

FIG. 2 is a block diagram showing the configuration of the user terminal, according to an exemplary embodiment.

Referring to FIG. 2, the user terminal 110 comprises a smart card 210, a tag reader 215, a communication module 220, an inputting device 225, a positional data obtaining device 230, a display 235, a storage 240, and a controller 245.

The smart card 210 may include a plurality of storage sections. For example, the smart card 210 may have a non-secured storage section and a secured storage section. The non-secured storage section is accessible to be read by or to be written to by an external system, such as the access authentication system, while the secured storage section is not accessible to be read by or to be written to by an external system.

The smart card 210 stores at least one of the access authentication data and a positional data. At least one of the access authentication data and the positional data may be stored in the secured storage section.

The tag reader 215 reads the tag of the access authentication card, obtains the access authentication data, and outputs the obtained access authentication data to the controller 245.

The communication module 220 transmits data to and receives data from other devices, such as the access authentication system, via wired or wireless communication, directly or over a network.

The inputting device 225 is configured to receive a control command from the user, such as command for controlling the user terminal 110 or a command for controlling an application installed in the user terminal. For example, the inputting device 225 may be, but not limited to, a plurality of buttons, such as number/character keys, for example, * or # key, and at least one function key such as menu key, call key, OK key, hot key for executing an application, or may be a touch screen.

For example, the inputting device 225 may provide the positional data, which the user inputs or selects, to the controller 245. The positional data that is inputted or selected by means of the inputting device 225 may be mapped to the access authentication data that is read from the tag in the access authentication card.

The positional data obtaining device 230 is connected to a positional data providing server via a network, and the positional data obtaining device 230 is configured to transmit a request for providing positional data of the user terminal to the positional data providing server to obtain the current positional data. The request for providing positional data may comprise at least one of terminal data of the user terminal 110 and node B or BTS (base transceiver station) data.

It will be appreciated that the positional data obtaining device 230 may include a GPS (Global Positioning System) module for receiving a GPS signal from at least one satellite and acquire the current positional data of the user terminal by use of the received GPS signal.

The display 235 is configured to visually output at least one of the control command from the inputting device and data stored in the storage 240. For example, the display 235 may be a LCD (Liquid Crystal Display) screen.

The storage 240 stores, for example, applications required to operate the user terminal 110 and the current positional data, etc.

The controller 245 is configured to control internal components of the user terminal 110, such as the smart card 210, the tag reader 215, the communication module 220, the positional data obtaining device 230, the displayer 235, and the storage 240. The controller may be a processor, microprocessor, central processing unit, or the like.

Also, the controller 245 selects the access authentication data corresponding to the current positional data that is obtained by the positional data obtaining device 230. For example, the controller 245 transfers one of the access authentication data, which corresponds to the current positional data, stored in the secured storage section of the smart card 210, to the non-secured storage section, such that the access authentication data is accessible by an access reader connected to the access authentication system.

Alternatively, for example, the controller 245 may set up flags for each access authentication data stored in the smart card 210 and selectively activate the access authentication data corresponding to the current positional data by hiding/disabling or showing/enabling the flags. In detail, the controller 245 may show the flag for the access authentication data that is stored in the smart card 210 and corresponds to the current positional data, to allow the access reader of the access authentication system to access.

Figure 3:
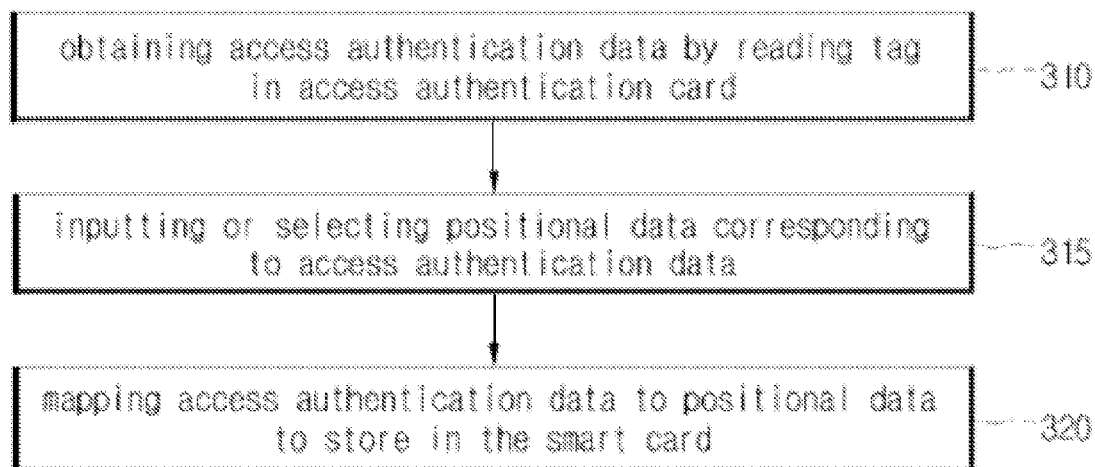
FIG. 3 is a flowchart for duplicating and storing data of the access authentication card, performed by the user terminal, according to an exemplary embodiment.

FIG. 3 is a flowchart for duplicating and storing data of the access authentication card, performed by the user terminal, according to an exemplary embodiment. Although each step of FIG. 3 to be described is performed by internal components of the user terminal, the internal components of the user terminal will be collectively referred to the 'user terminal' for understanding and the convenience of describing. Hereinafter, it is assumed that the access authentication card is a smart card equipped with tag.

In 310, the user terminal 110 obtains the access authentication data by reading the tag in the access authentication card by means of the tag reader.

In detail, the user terminal 110 transmits a radio frequency (RF) signal for obtaining the access authentication data to the access authentication card through the tag reader. In response to an authentication data request from the access authentication card to verify the request of the user terminal 110, the user terminal 110 transmits the authentication data, that is inputted or stored, to the access authentication card. Then, the access authentication card performs an authentication on the user terminal 110 by using the received authentication data. For example, the access authentication card may authenticate the user terminal by comparing the received authentication data to a pre-stored authentication data.

If the received authentication data is not identical to the pre-stored authentication data, the access authentication card transmits an error message to the user terminal 110. If the received authentication data is identical to the pre-stored authentication data, the access authentication card encrypts the stored access authentication data by the predetermined encryption algorithm and transmits to the user terminal 110 the encrypted access authentication data.

In 315, the user terminal 110 receives the positional data to be set up for the access authentication data from the user. That is to say, positional data to be associated with the access authentication data is obtained.

In 320, the user terminal 110 maps (i.e., associates) the access authentication data to the positional data, and stores the associated data in the secured storage section.

Figure 4:
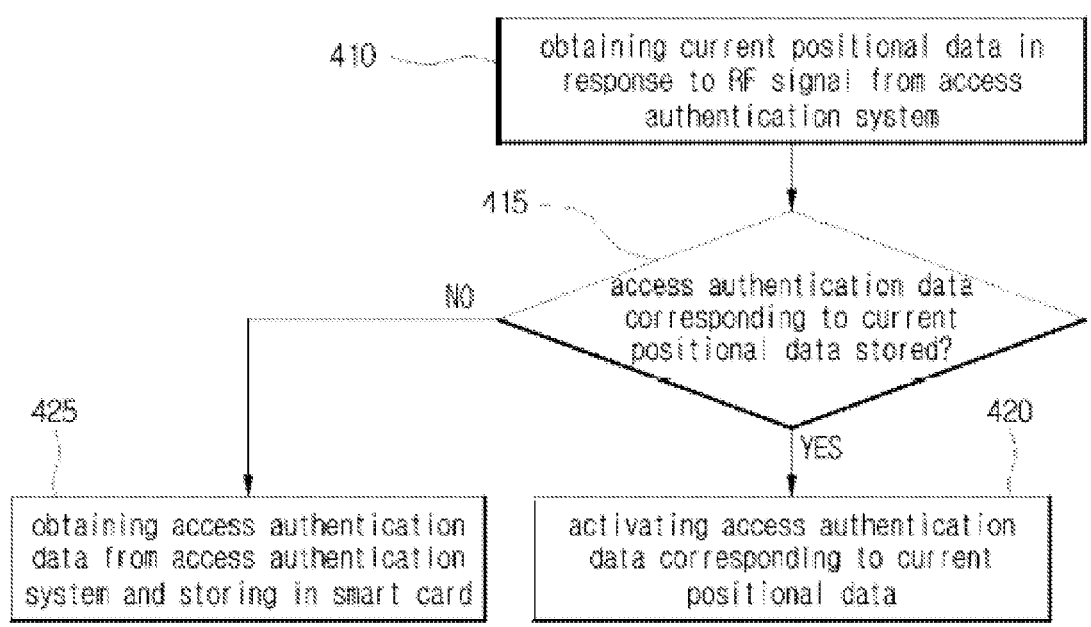
FIG. 4 is a flowchart for performing the access authentication, by the user terminal, according to an exemplary embodiment.

FIG. 4 is a flowchart of performing the access authentication, by the user terminal, according to an exemplary embodiment. Hereinafter, it is assumed that at least one access authentication data is stored in the smart card of the user terminal 110 by the method shown in FIG. 3. It will be also appreciated that the access authentication data may be stored in an internal memory of the user terminal 110 rather than the smart card.

In 410, as a response to an RF signal from the access reader connected to the access authentication system, the user terminal 110 transmits the request for providing positional data to the positional data providing server via a network, to obtain the current positional data of the user terminal 110.

It will be also appreciated that the user terminal 110 may be equipped with GPS module for receiving GPS signal to obtain the current positional data of the user terminal 110.

Alternatively, the user terminal 110 may transmit identification data of node B or BTS to which the user terminal is connected to the positional data providing server to obtain the current positional data of the user terminal 110.

In 415, the user terminal 110 determines the obtained current positional data corresponds to positional data of any of access authentication data stored in the user terminal 110.

If it is determined that access authentication data associated with positional data that corresponds to the obtained current positional data is stored, then in 420, the user terminal 110 activates the access authentication data associated with the positional data that corresponds to the obtained current positional data. In case that just one access authentication data is stored in the smart card of the user terminal 110, the activation of the access authentication data may be skipped.

For example, in case that there are a plurality of access authentication data, the user terminal 110 moves the access authentication data associated with the positional data that corresponds to the obtained current positional data into the non-secured storage section, to allow the access authentication system to access.

Alternatively, the user terminal 110 shows the flag that is set up for the access authentication data mapped to the current positional data to allow the access authentication system to access, thereby enabling access to the authentication data.

But, if the access authentication data associated with the positional data that corresponds to the obtained current positional data is not stored, the user terminal 110 transmits a request for providing access authentication data to the access authentication system to obtain the access authentication data and to store in the smart card of the user terminal 110. In this case, the request for providing access authentication data may comprise terminal data or user data of the user terminal 110.

In addition, the method of performing an access authentication in a user terminal according to an exemplary embodiment may be implemented in a form of a program code, which can be executed by an electronic device capable of electrically processing data, and then recorded in a storage medium. The program code may comprise at least one of a program code, a data file, and a data structure, or combination thereof.

The program code stored in the storage medium may be designed or implemented to implement the exemplary embodiments. The storage medium may be, but not limited to, a magnetic media, such as a hard disc drive, a floppy disc drive, and a magnetic tape, an optical media such as CD-ROM and DVD, a magneto-optical media such as a floptical disc, a semiconductor media such as ROM, RAM, and a flash memory for storing and executing program codes. The program code may be not only a machine language code produced by a compiler but also a high level language executable in the electronic device, such as a computer that electrically processes data by means of an interpreter.

The aforementioned hardware device may be implemented in the form of software module in part.

Although certain exemplary embodiments have been described, it shall be appreciated by anyone ordinarily skilled in the art to which the present invention pertains that there can be a variety of permutations and modifications of the present invention without departing from the technical ideas and scopes of the present invention that are disclosed in the claims appended below.

What is claimed is:

1. A user terminal that performs access authentication through communication with an access authentication system connected to an access reader, comprising:
   a communication module configured to receive from the access reader a radio frequency (RF) signal request to provide access authentication data associated with the access reader;
   a smart card configured to store first access authentication data, first positional data associated with a position of the access reader, second access authentication data, and second positional data associated with a position of another access reader,
   wherein the smart card comprises:
   a secured storage section configured to store the first access authentication data, the first positional data, the second access authentication data, and the second positional data, wherein the secured storage section is inaccessible to the access reader and the other access reader; and
   a non-secured storage section configured to store selected access authentication data, wherein the non-secured storage section is accessible to the access reader and the other access reader;
   a positional data obtaining device configured to obtain current positional data of the user terminal; and
   a controller configured to:
      in response to the communication module receiving the radio frequency (RF) signal request from the access reader, determine whether one of the first positional data associated with the first access authentication data and the second positional data associated with the second access authentication data corresponds to the current positional data;
      in response to determining that one of the first positional data associated with the first access authentication data and the second positional data associated with the second access authentication data corresponds to the current positional data, select the one of the first access authentication data and the second access authentication data having positional data corresponding to the current positional data as the selected access authentication data associated with the access reader;
      in response to determining that one of the first positional data associated with the first access authentication data and the second positional data associated with the second access authentication data does not correspond to the current positional data, control the communication module to transmit a request for providing access authentication data, the request comprising terminal data or user data, to the access authentication system to obtain the access authentication data associated with the access reader, control the communication module to receive the access authentication data associated with the access reader from the authentication system, and store the received access authentication data in the secured storage section of the smart card in association with the current positional data as selected access authentication data;
      copy the selected access authentication data to the non-secured storage section; and control the communication module to provide the selected access authentication data to the access reader.

2. The user terminal of claim 1, further comprising:
a reader configured to read a tag attached to an access authentication card and obtain access authentication data from the tag; and
an inputting device configured to receive an input of positional data,
wherein the controller is configured to store the access authentication data in association with the inputted positional data in the secured storage section.

3. The user terminal of claim 1, wherein the positional data obtaining device obtains the current positional data from a positional data providing server in response to the communication module receiving the RF signal from the access reader.

4. A method of performing an access authentication in a user terminal through communication with an access authentication system connected to an access reader, the method comprising:
storing in a secured storage section of a smart card first access authentication data, first positional data associated with a position of the access reader, second access authentication data, and second positional data associated with a position of another access reader, wherein the secured storage section is inaccessible to the access reader and the other access reader;
receiving from the access reader a radio frequency (RF) signal request to provide access authentication data associated with the access reader;
obtaining current positional data of the user terminal in response to receiving a radio frequency (RF) signal from the access reader;
determining whether one of the first positional data associated with the first access authentication data and the second positional data associated with the second access authentication data corresponds to the current positional data;
in response to determining that one of the first positional data associated with the first access authentication data and the second positional data associated with the second access authentication data corresponds to the current positional data, selecting one of the first access authentication data and the second access authentication data having positional data corresponding to the current positional data as the selected access authentication data associated with the access reader;
in response to determining that one of the first positional data associated with the first access authentication data and the second positional data associated with the second access authentication data does not correspond to the current positional data, transmitting a request for providing access authentication data, the request comprising terminal data or user data, to the access authentication system to obtain the access authentication data associated with the access reader, receiving the access authentication data associated with the access reader from the authentication system, and storing the received access authentication data in the secured storage section of the smart card in association with the current positional data as selected access authentication data;
copying the selected access authentication data to a non-secured storage section of the smart card, wherein the non-secured storage section is accessible to the access reader and the other access reader; and
providing the selected access authentication to the access reader.

5. The method of claim 4, wherein the user terminal comprises a tag reader, and
wherein the method further comprises:
prior to obtaining the current positional data of the user terminal, obtaining the access authentication data associated with the access reader by reading a tag attached to an access authentication card through the tag reader;
receiving the positional data associated with access authentication data associated with the access reader; and
associating the access authentication data with the received positional data and storing the associated data in the smart card as the first access authentication data and first positional data associated with a position of the access reader.

6. The method of claim 4, wherein the obtaining current positional data of the user terminal comprises obtaining the current positional data from a positional data providing server in response to receiving the RF signal from the access reader.

7. An access authentication device comprising:
a communication module configured to receive a request for access authentication data from an access reader and transmit a response to the access reader;
a memory comprising:
a secured storage section configured to store first access authentication data, first positional data associated with the first access authentication data, second access authentication data, and second positional data associated with the second authentication data, wherein the secured storage section is inaccessible to the access reader; and
a non-secured storage section configured to store selected access authentication data, wherein the non-secured storage section is accessible to the access reader; and
a processor configured to:
determine a current position of the access authentication device;
determine whether one of the first positional data and the second positional data corresponds to the current position;
in response to determining that one of the first positional data and the second positional data corresponds to the current position, select one of the first access authentication data and the second access authentication data associated with the one of the first positional data and the second positional data that corresponds to the current position, as the selected access authentication data;
in response to determining that one of the first positional data and the second positional data does not correspond to the current position, control the communication module to transmit a request for providing access authentication data, the request comprising terminal data or user data, to an access authentication system to obtain the access authentication data associated with the access reader, control the communication module to receive the access authentication data associated with the access reader from the authentication system, and store the received access authentication data in the secured storage section of the memory in association with the current position as the selected access authentication data;
copy the selected access authentication data to the non-secured storage section; and
control the communication module to transmit the selected access authentication data to the access reader.

8. The access authentication device of claim 7, wherein the first positional data comprises first global positioning system (GPS) data and the second positional data comprises second GPS data.

9. The access authentication device of claim 8, wherein the first GPS data comprises a first GPS position of a first authentication system and the second GPS data comprises a second GPS position of a second authentication system.

10. The access authentication device of claim 9, further comprising a reader configured to read the first access authentication data from a first radio frequency identification (RFID) tag of a first identification (ID) card and read the second access authentication data from a second RFID tag of a second ID card, wherein the processor is further configured to store in the secured storage section of the memory the first access authentication data and the second access authentication data read by the reader.

\* \* \* \* \*